(12) United States Patent
Everitt et al.

(10) Patent No.: US 7,717,742 B2
(45) Date of Patent: May 18, 2010

(54) APPARATUS FOR MECHANICAL AND ELECTRICAL CONNECTION

(75) Inventors: Richard John Everitt, Breda (NL);
Nicolaas Johannes Damstra, Breda (NL); Jeroen Rotte, Breda (NL);
Reinhard Weber, Reinheim (DE)

(73) Assignee: Thomon Licensing, Boulogne-Billancourt (FR)

( * ) Notice: Subject to any disclaimer, the term of this patent is extended or adjusted under 35 U.S.C. 154(b) by 183 days.

(21) Appl. No.: 11/922,448

(22) PCT Filed: Jun. 1, 2006

(86) PCT No.: PCT/EP2006/062817
§ 371 (c)(1),
(2), (4) Date: Dec. 18, 2007

(87) PCT Pub. No.: WO2006/136488
PCT Pub. Date: Dec. 28, 2006

(65) Prior Publication Data
US 2009/0239416 A1    Sep. 24, 2009

(30) Foreign Application Priority Data
Jun. 22, 2005    (DE) .................. 10 2005 029 293

(51) Int. Cl.
*H01R 13/73* (2006.01)
(52) U.S. Cl. .................................. 439/563
(58) Field of Classification Search ........... 439/567, 439/577, 79, 630, 237, 331; 361/740–741, 361/752, 756, 759; 200/529, 290, 292
See application file for complete search history.

(56) References Cited

U.S. PATENT DOCUMENTS 3,731,030 A * 5/1973 Holzer ................ 200/529
4,352,536 A * 10/1982 Goldberg ............. 439/325

(Continued)

FOREIGN PATENT DOCUMENTS

DE    199442924    2/2003

(Continued)

OTHER PUBLICATIONS

Patent Abstracts of Japan, vol. 015, No. 229, Jun. 11, 1991 & JP 3-067475 (Mitsubishi Corp) See Ref. AG.

(Continued)

*Primary Examiner*—Jean F Duverne
(74) *Attorney, Agent, or Firm*—Robert D. Shedd; Jeffrey M. Navon

(57) ABSTRACT

An apparatus is proposed for detachable mechanical and electrical and/or optical connection of a recording appliance to an imaging apparatus. The apparatus comprises a mounting board and an insert board, which is pushed into the mounting board. In this case, the mounting board has guides on opposite sides, which hold the insert board in an interlocking manner in the pushed-in state. Electrical and/or optical contacts on the mounting board and on the insert board are connected to one another when the insert board has been pushed essentially completely into the guides on the mounting board. In one embodiment, a locking lever is provided, which converts a rotary movement of the locking lever to a linear movement of the insert board in the insertion direction. A latching position is provided in an end position of the locking lever.

11 Claims, 3 Drawing Sheets

U.S. PATENT DOCUMENTS

| | | | |
|---|---|---|---|
| 4,386,240 A * | 5/1983 | Philipp et al. | 379/422 |
| 4,755,873 A | 7/1988 | Kobayashi | |
| 5,230,633 A * | 7/1993 | Hisatomi et al. | 439/79 |
| 6,364,259 B1 | 4/2002 | Boudard | |
| 7,144,276 B1 * | 12/2006 | Yang | 439/630 |
| 7,390,211 B2 | 6/2008 | Moscovitch | |

FOREIGN PATENT DOCUMENTS

| | | |
|---|---|---|
| DE | 10330260 | 2/2005 |
| DE | 2004002539 | 7/2005 |
| DE | 60015365 | 10/2005 |
| EP | 0302617 | 2/1989 |
| EP | 0420490 | 4/1991 |
| EP | 0667544 | 8/1995 |
| EP | 0485196 | 5/2002 |
| EP | 1524836 | 4/2005 |
| JP | 3-67475 | 3/1991 |

OTHER PUBLICATIONS

Search Report Dated Aug. 17, 2006.

* cited by examiner

APPARATUS FOR MECHANICAL AND ELECTRICAL CONNECTION

This application claims the benefit, under 35 U.S.C. § 365 of International Application PCT/EP2006/136488, filed Jun. 1, 2006, which was published in accordance with PCT Article 21(2) on Dec. 28, 2006 in English and which claims the benefit of German patent application No. 102005029293.3, filed Jun. 22, 2005.

The invention relates to an apparatus for detachable mechanical and electrical connection of a recording appliance to an imaging apparatus. For the purposes of the invention, an imaging apparatus is, for example, a camera. The expressions imaging apparatus and camera are used synonymously in the following text. For the purposes of the invention, a recording appliance is, for example, a video recorder or a solid-state memory unit, which is also known as a flash memory. The expressions recording appliance, flash memory or memory are used synonymously in the following text.

Digital video cameras are increasingly being used to make video recordings of events, and their recorded signals can be processed essentially without any losses using digital mixing consoles. A further advantage is the capability to copy or to compress digital video signals without any losses. Furthermore, there is no need to convert analogue signals to digital signals for the further-processing of digital video signals. Digital video cameras, in particular video cameras for high-resolution video signals or HDTV, generate relatively large amounts of raw video data, which must first of all be stored. Memory arrangements with one or more hard discs are normally used for storage of the raw video data. The camera is connected to the memory arrangement via a cable. However, the cable considerably restricts the freedom of movement of the cameraman. It is thus desirable to detachably connect a recording appliance directly to the camera.

The apparatus specified in Patent Claim 1 achieves the stated object with the features specified in the characterizing part. Advantageous refinements and further developments of the invention are specified in the dependent claims.

The apparatus according to the invention comprises a mounting board and an insert board, which is pushed into guides on the mounting board. The mounting board preferably has two guides on opposite first and second sides. The insert board is pushed into the guides on a plane parallel to the mounting board, from a third side. The insert board and the guides on the mounting board form an interlocking connection. Electrical and/or optical contacts are provided on a fourth side of the mounting board, which is preferably opposite the third side. Electrical and/or optical contacts are provided on the corresponding side of the insert board, via which power and/or data are/is transmitted from the camera to the recording appliance and/or in the opposite direction once the insert board has been pushed essentially completely into the guides on the mounting board.

In one embodiment of the invention, the distance between the guides which are provided on the first and second side of the mounting board is greater on the third side than on the fourth side. In a corresponding manner, the dimensions of the insert board are greater on the third side than on the fourth side. This means that an interlocking connection is formed only when the insert board has been at least partially pushed into the guides on the mounting board. This advantageously makes it easier to insert the insert board into the guides on the mounting board. For example, one side of the insert board can be hooked into a guide first of all, the insert board can then be aligned parallel with the mounting board, and only after this has been done is it fully pushed in the direction of the two guides on the mounting board as far as the stop.

In a further embodiment of the invention, the insert board is provided with a slotted-link guide, in which a locking lever, which is mounted on the mounting board such that it can pivot, engages.

In yet another embodiment of the invention, the locking lever converts a pivoting movement to a linear movement in the insertion direction of the insert board. For this purpose, the slotted-link guide is arranged at least partially oblique in the insert board.

In one further development of the invention, that end of the slotted-link guide which corresponds to an insert board which has been pushed completely into the guides on the mounting board is provided with a latching position. For this purpose, the slotted-link guide is arranged, for example, parallel to the pivoting plane of the locking lever in the area of the latching position, or even continues slightly away from it.

In one embodiment of the invention, the locking lever is spring-loaded in the direction of the pivoting axis. Particularly in the case of the embodiment with the latching position, this means that the latching-in process can be sensed on operation.

In another embodiment of the invention, a roller which is mounted such that it can rotate is provided on an arm, which engages in the slotted-link guide, of the locking lever.

The locking lever preferably does not engage in the slotted-link guide until the majority of the insert board has been pushed into the guides on the mounting board. In consequence, the conversion of the rotary movement to the linear movement can be carried out such that the operation of the locking lever brings the contacts of the mounting board and of the insert board into contact with one another, or detaches them.

The apparatus described above can advantageously be used with a camera. In this case, it is irrelevant whether the mounting board is fitted to the camera or to the recording appliance. The type of recording appliance is likewise irrelevant. It may be a conventional video recording appliance or an arrangement which writes digital video data to a solid-state memory, for example a flash memory.

The invention will be described in the following text with reference to the drawing, in which.

Identical or similar elements are provided with the same reference symbols in the figures.

Figure 1:
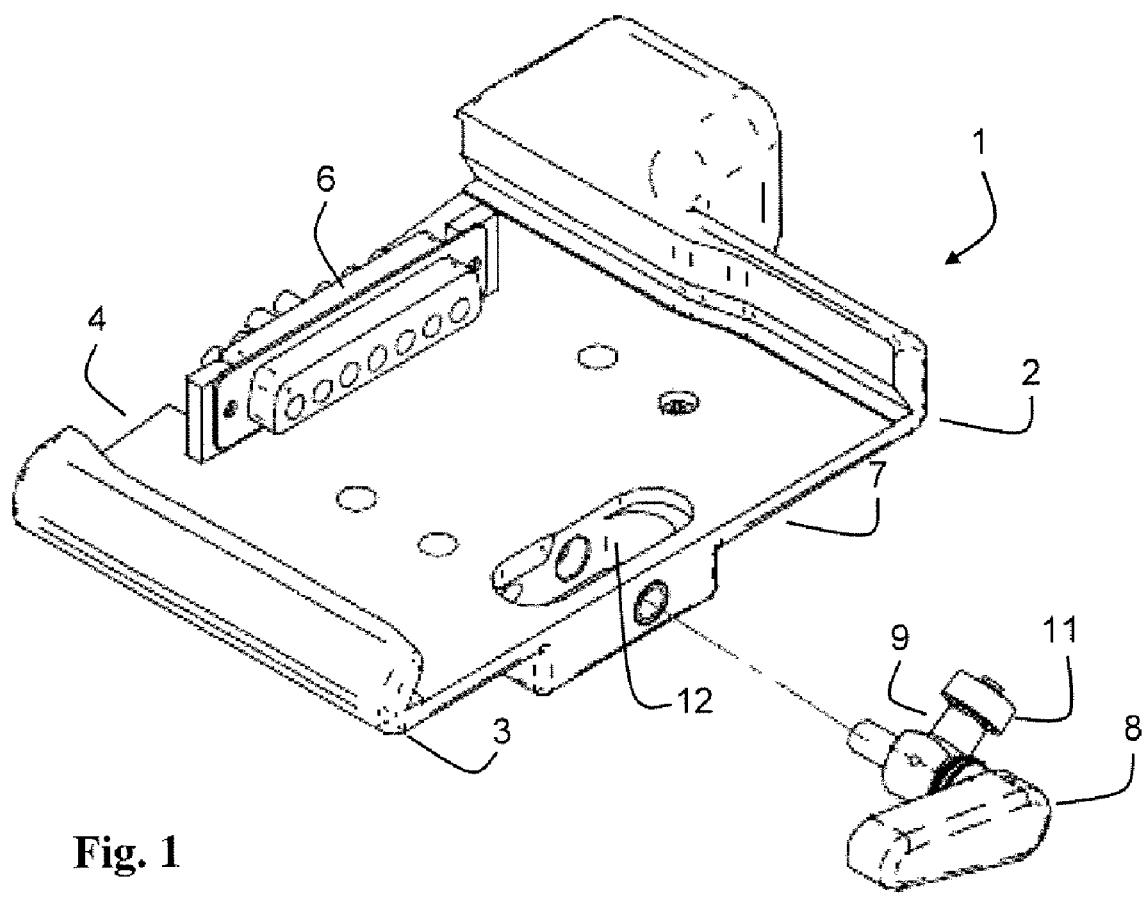
FIG. 1 shows a perspective view of the mounting board according to the invention.

FIG. 1 shows a mounting board 1 according to the invention. A first and a second side of the mounting board 1 are provided with guides 2, 3. In the example illustrated in FIG. 1, the guides 2, 3 are in the form of notches in the sidewalls. Contacts in the form of a plug 6 are provided on a fourth side 4 of the mounting board 1. A locking lever 8 is provided on an open third side 7 of the mounting board 1. In the figure, the locking lever 8 is illustrated in the same way as in an exploded drawing away from its installed position. The locking lever 8 can be rotated about the dashed-dotted line in the installed state. The locking lever 8 has a roller 11, which is mounted such that it can rotate, on an arm 9. In the unlocked state, the arm 9 and the roller 11 are pivoted through an opening 12 in the mounting board 1, so that an insert board 20 can be pushed into the guides 2, 3 on the mounting board 1 from the third side 7. The figure clearly shows that the distance between the guides 2, 3 on the third side 7 is greater than on the fourth side 4.

Figure 2:
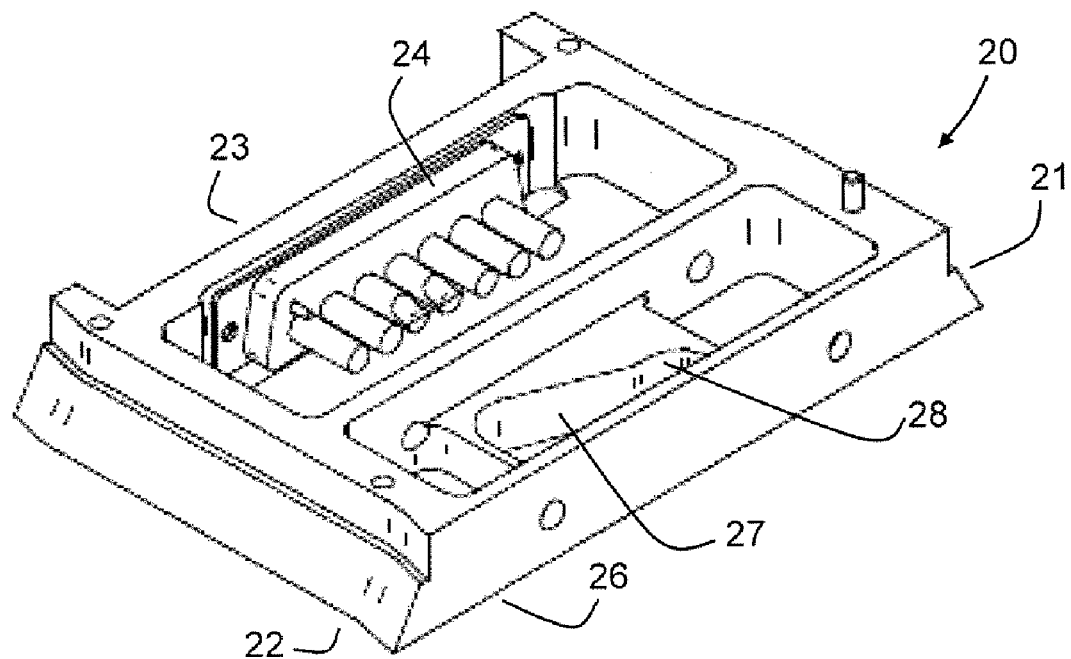
FIG. 2 shows a perspective view of the insert board.

FIG. 2 illustrates an insert board 20 according to the invention, which can be connected to the mounting board 1. A first side 21 and a second side 22 of the insert board 20 are shaped such that they engage in correspondingly shaped guides 2, 3 on the mounting board 1, and form an interlocking connection with them. Contacts in the form of a connector 24 are provided on a fourth side 23 of the insert board 20 and make contact with the contacts in the connector 6 on the mounting board 1 when the insert board 20 has been pushed essentially completely into the mounting board 1. A slotted-link guide 27 is provided close to a fourth side 26 of the insert board 20. The roller 11 on the arm 9 of the locking lever 8 engages in the slotted-link guide 27 once the insert board 20 has been pushed far enough into the mounting board 1. The slotted-link guide 27 is shaped such that a rotary movement of the locking lever 8 is converted to a linear movement in the insertion direction. This advantageously converts the increased force applied, which is necessary to join the two connectors 6, 24 together or to disconnect them, to a rotary movement of the locking lever 8. The slotted-link guide 27 is also shaped such that a latching effect is achieved in one end position 28 of the locking lever 8. The locking lever 8 is in this case preferably spring-loaded in the axial direction.

Figure 3:
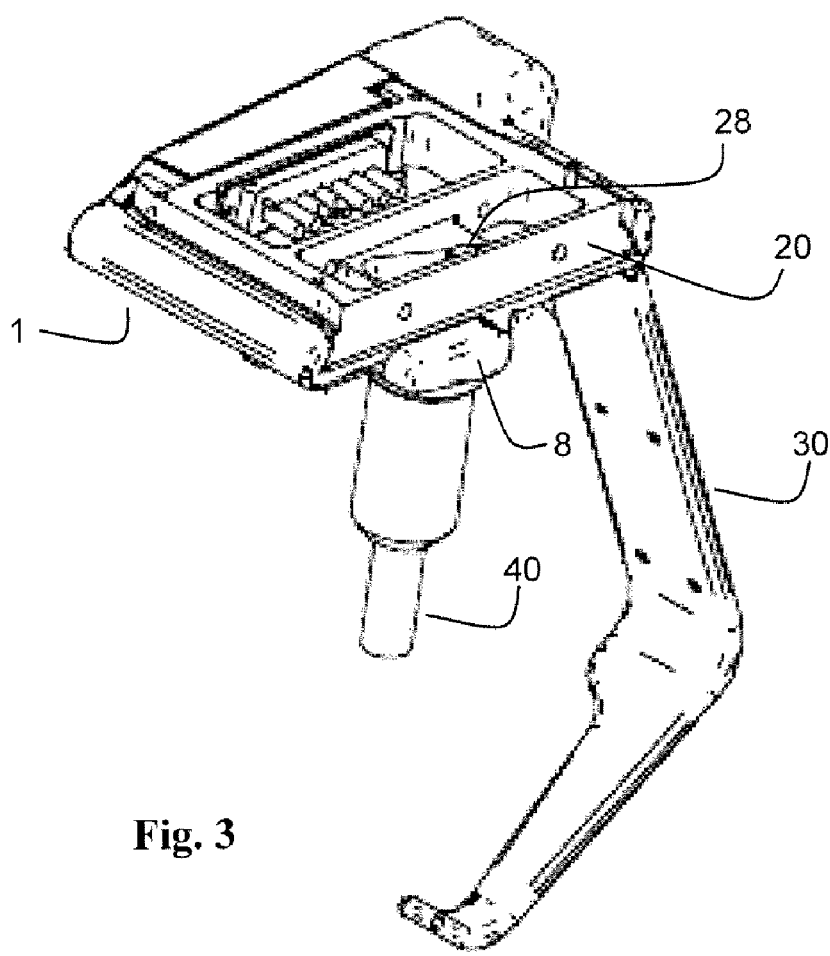
FIG. 3 shows a perspective view of the joined-together mounting board and insert board.

In the illustration in FIG. 3, the insert board 20 has been completely pushed into the mounting board 1. The locking lever 8 has been pivoted such that the roller 11 on the arm 9 is in the end position 28. A mounting bracket 30 is also fitted to the mounting board 1, by means of which the mounting board 1 can be attached, for example, to a camera (not illustrated). Electrical and/or optical connections from the camera (not illustrated) to the mounting board 1 are produced via a connector 40, which is plugged onto the mounting board 1 from underneath. However, the camera and the mounting board 1 may also be connected differently. The figure clearly shows the interlocking connection of the mounting board 1 and insert board 20. The different distances between the guides 2, 3 on the mounting board 1 on the third and fourth sides 7, 4 allow the insert board 20 first of all to be hooked into one guide, the insert board 20 and the mounting board 1 then to be aligned parallel to one another, and the insertion of the insert board 20 into the mounting board 1 to be completed by means of the locking lever 8 only once this has been done.

In one embodiment of the invention, once the insert board is fully inserted, into the mounting board, the insert board and the mounting board are in contact only in three points, designated a, b and c in the figure, e.g. in the area of the guides. This results in the smallest possible contact area to be achieved while providing a non-loose connection of the two parts. A larger number of contact point is, however, not precluded.

Figure 4:
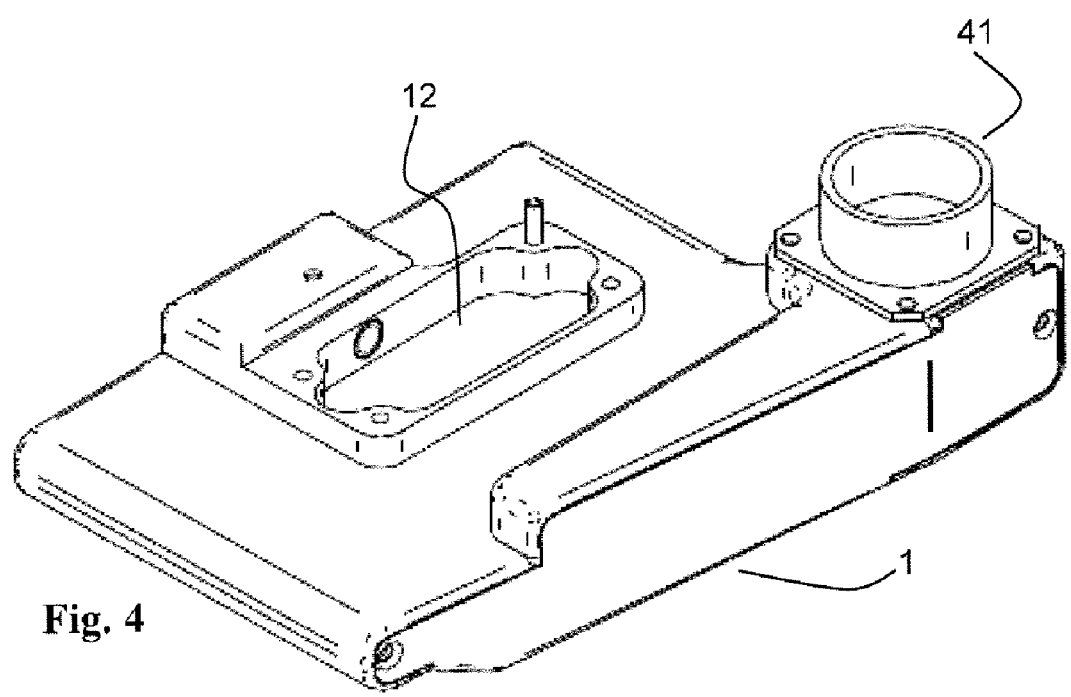
FIG. 4 shows a perspective view of the lower face of the mounting board.

FIG. 4 illustrates the lower face of the mounting board 1. The figure clearly shows a bore of the bearing 42 in which the locking lever 8 having the arm 9 and the roller 11 (not illustrated) is mounted such that it can pivot. A male connector or a female connector 41 is also illustrated, by means of which contact can be made between the camera (not illustrated) and the mounting board 1, for example by means of a cable which has a corresponding mating piece.

Figure 5:
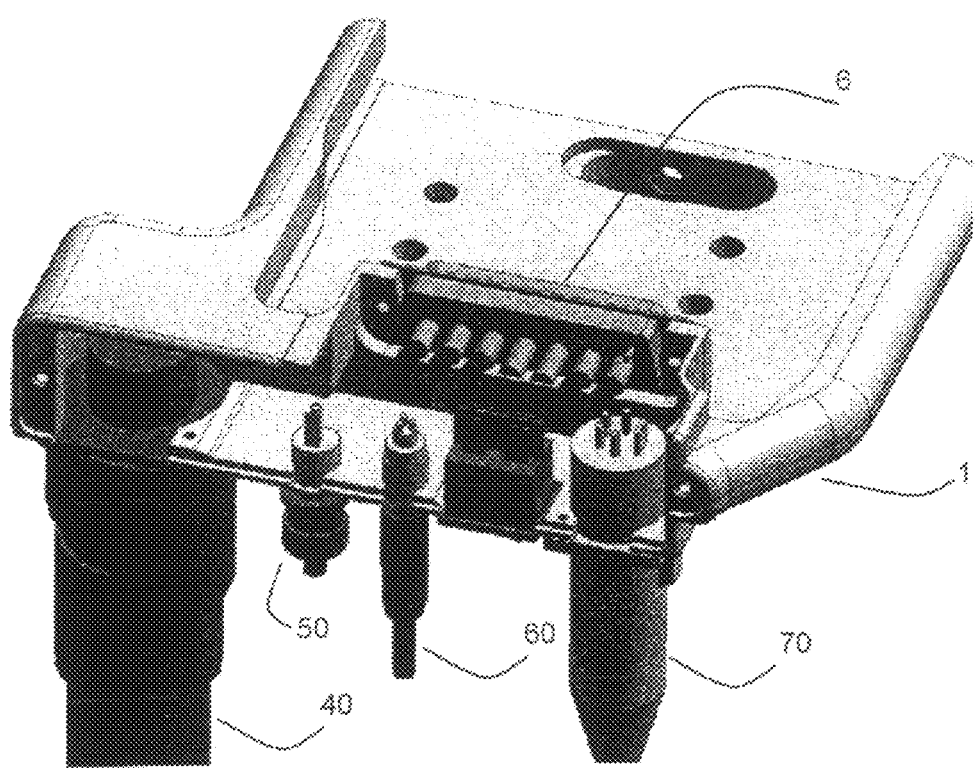
FIG. 5 shows a further perspective view of the mounting board.

FIG. 5 illustrates a detail of the mounting board 1. The figure shows how different connections 40, 50, 60, 70 are provided on the mounting board 1, and are connected to the connector 6. For simplicity, the cables from the connections 40, 50, 60, 70 to the connector 6 are not illustrated in the figure.

The apparatus according to the invention can also be used for connection of a recording appliance to a replay appliance, rather than for connection of a camera to the recording appliance. For example, the recording appliance can first of all be connected to the camera when images are being recorded. The recording appliance is then disconnected from the camera and is connected to a replay appliance. In this case, it is irrelevant to the invention whether the replay appliance is used to display the recorded images or whether the images which have been stored in the recording appliance are passed on for further processing or storage. In any case, the camera or the replay appliance is provided with a mounting board or an insert board, as has been described further above.

The invention claimed is:

1. An apparatus for detachable mechanical and electrical and/or optical connection of a recording appliance to an imaging apparatus or a replay appliance, wherein a mounting board and an insert board are provided, guides being formed on two opposite first and second sides of the mounting board and making an interlocking connection with the insert board, which insert board can be pushed into the guides from a third side on a plane parallel to the mounting board, wherein first electrical and/or optical contacts are provided on a fourth side of the mounting board and are connected to second electrical and/or optical contacts, which second electrical and/or optical contacts are provided on the insert board, wherein the electrical and/or optical connection is established when the insert board has been pushed essentially completely into the guides on the mounting board, wherein the distance between the guides, which are provided on the first and second side of the mounting board and the corresponding first and second sides of the insert board which engage in the guides is larger on the respective third side than on the fourth side, wherein the mounting board is open in a direction orthogonal to the plane parallel to the mounting board such that the insert board can be placed between the guides through the opening, wherein the interlocking connection exists only when the insert board has been at least partially pushed into the guides on the mounting board.

2. The apparatus of claim 1, wherein the insert board is provided with a slotted-link guide, in which a locking lever, which is mounted on the mounting board such that it can pivot, engages.

3. The apparatus of claim 2, wherein the slotted-link guide converts a pivoting movement of the locking lever to a linear movement in the insertion direction of the insert board.

4. The apparatus of claim 2, wherein a latching position is provided at one end of the slotted-link guide which end corresponds to an insert board which has been pushed completely into the guides on the mounting board.

5. The apparatus of claim 2, wherein the locking lever is spring-loaded in the direction of the pivoting axis.

6. The apparatus of claim 2, wherein a roller which is mounted such that it can rotate is provided on an arm of the locking lever, which engages in the slotted-link guide,.

7. The apparatus of claim 2, wherein the locking lever does not engage in the slotted-link guide until the majority of the insert board has been pushed into the guides on the mounting board.

8. The apparatus of claim 1, wherein the insert board and the mounting board are in contact in at least three points when the insert board is fully inserted.

9. Imaging apparatus/camera having a mounting board or insert board of the apparatus according to claim 1.

10. Recording appliance, in particular a flash memory unit, having a mounting board or insert board of the apparatus according to claim 1.

11. Replay appliance having a mounting board or insert board of the apparatus according to claim 1.

* * * * *